US008050658B2

(12) United States Patent
Hong (10) Patent No.: US 8,050,658 B2
(45) Date of Patent: Nov. 1, 2011

(54) METHOD FOR SIGNALING VOICE CALL OF MOBILE TERMINAL (75) Inventor: Kwang-Sik Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 982 days.

(21) Appl. No.: 11/963,490

(22) Filed: Dec. 21, 2007

(65) Prior Publication Data

US 2008/0155674 A1 Jun. 26, 2008

(30) Foreign Application Priority Data

Dec. 21, 2006 (KR) ........................ 10-2006-0132138

(51) Int. Cl.
*H04M 1/66* (2006.01)
(52) U.S. Cl. ........ 455/411; 455/432; 455/435; 455/436; 455/445; 455/512; 713/151; 726/4; 726/17; 726/26; 379/114.5; 380/247
(58) Field of Classification Search .................. 455/411, 455/432, 435, 436, 445, 512; 713/151; 726/4, 726/26, 17; 379/114.15; 380/247
See application file for complete search history.

(56) References Cited

U.S. PATENT DOCUMENTS

| 7,395,341 | B2 * | 7/2008 | Nicodemus et al. | 709/229 |
| 7,484,240 | B2 * | 1/2009 | Faccin et al. | 726/4 |
| 7,711,848 | B2 * | 5/2010 | Maes | 709/239 |
| 2002/0194499 | A1 * | 12/2002 | Audebert et al. | 713/201 |
| 2006/0094403 | A1 * | 5/2006 | Norefors et al. | 455/411 |

* cited by examiner

*Primary Examiner* — Jinsong Hu
*Assistant Examiner* — Amancio Gonzalez
(74) *Attorney, Agent, or Firm* — Birch, Stewart, Kolasch & Birch, LLP

(57) ABSTRACT

A computer program product, apparatus and method for establishing a voice call of a mobile communication system includes: authenticating an origination terminal through a traffic channel by performing call connection between the origination terminal and an origination side network; authenticating a destination terminal through a traffic channel by performing call connection between a termination side network and the destination terminal when the authentication is successful; and establishing a speech path between the origination terminal and the destination terminal when the destination terminal is successfully authenticated. A request and submission of an OTP for authenticating a user of a mobile terminal is possibly performed according to the voice call protocol, whereby the security of the mobile terminal can be strengthened and the strong demand of users with respect to protecting the privacy and information can be satisfied.

16 Claims, 5 Drawing Sheets

METHOD FOR SIGNALING VOICE CALL OF MOBILE TERMINAL

CROSS REFERENCE TO RELATED APPLICATIONS

The present application is related to and claims priority to Korean patent application 10-2006-0132138, filed on Dec. 21, 2006, the entire contents of which is incorporated herein by reference.

BACKGROUND OF THE INVENTION

1. Field of the Invention

The present invention relates to a mobile terminal and, more particularly, to a method for signaling a voice calf of a mobile terminal.

2. Description of the Background Art

As a method for acquiring security of a mobile terminal, a method in which the user of a mobile terminal is authenticated when an authentication value of the mobile terminal and that of a radio network are identical by using an authentication key (A-key) is typically used. However, this method has a problem in that when an ESN (Electronic Serial Number), a MIN (Mobile Identification Number), or the authentication key (A-key) value information of the user is exposed, the authentication value of the terminal may be easily copied, so the security of the mobile terminal cannot be permanently guaranteed.

In the electronic banking field, in most cases, a method of authenticating the user by using a random number table card is used, which, however, has a limitation in that the random number table card is generated within a certain rule. In an effort to solve the problem, recently, a temporary password called a one time pass (OTP) is used. Namely, the terminal transfers an OTP to an Internet application server through the wireless Internet to perform user authentication. In this case, however, in order to transfer the OTP through the wireless Internet, a packet data call with a service option 33 is required but, in case of a general voice call, there is no signaling method for processing the authentication of the OTP transfer method.

Namely, in order to strengthen security for a voice call of the mobile terminal, a signaling method for performing the OTP authentication according to the voice call protocol is required, but currently, there is no voice call setting signaling employing the OTP authentication yet.

SUMMARY OF THE INVENTION

An object of the present invention is to provide a device, computer program product and method for signaling a voice call of a mobile terminal capable of performing authentication using an OTP (One Time Password) according to a voice call protocol of a mobile communication system and its relevant signaling procedure.

One aspect of the present invention is a device, computer program product and method for establishing a voice call of a mobile communication system that includes authenticating an origination terminal through a traffic channel by performing call connection between the origination terminal and an origination side network; authenticating a destination terminal through a traffic channel by performing call connection between a termination side network and the destination terminal when the authentication is successful; and establishing a speech path between the origination terminal and the destination terminal when the destination terminal is successfully authenticated.

Another aspect of the present invention is a device, computer program product and method for establishing a voice call of an origination terminal may include: opening a traffic channel by establishing a traffic channel with a network; requesting an authentication server to authenticate a caller through the traffic channel; receiving a call connection result of an originating side and an authentication result of a destination terminal when the call is successfully authenticated; and establishing a speech path with the destination terminal when the call connection result and the destination terminal authentication result denote success.

Another aspect of the present invention is a device, computer program product and method for establishing a voice call of a destination terminal may include: opening a traffic channel by establishing a traffic channel with a network; receiving a callee authentication request from the network through the traffic channel; submitting a certain authentication key to an authentication server according to the authentication request; and informing the user that a call has been received when the authentication is successful and establishing a speech path with an originating side.

The foregoing and other objects, features, aspects and advantages of the present invention will in part become more apparent from the following detailed description of the present invention or be learned by the practice of the present invention when taken in conjunction with the accompanying drawings and structures disclosed in the appended claims.

DETAILED DESCRIPTION OF THE INVENTION

Description will now be given in detail of the present invention, with reference to the accompanying drawings.

In the present invention, a request end a submission of an OTP (One Time Pass) for user authentication of a mobile terminal can be made according to a voice call protocol. Namely, the present invention includes a signaling device, computer program product and method in which en authentication procedure using the OTP is not performed through a data session of a packet data call but is performed in the process of establishing a general voice call. The present invention provides security for a call against replay attacks of coped terminals occurring as an ESN or an authentication key (e.g., A-key) of a mobile terminal is exposed due to the properties of the OTP scheme that performs authentication by using a different OTP each time.

In the related art mobile OTP technique, when the mobile terminal submits an OTP to an application server for user authentication, it secures a data session by opening 1X data or an Evolution-Data Optimized (EVDO) data call, and the OTP authentication is requested and then submitted through a TCP/IP, thus performing user authentication.

Comparatively, in the present invention, the request or submission of the OTP authentication can be made through a general CDMA call processing signaling message used in a mobile communication system (e.g., IS-2000 system). Thus, a signaling means that can be applicable also to the OTP authentication, which has been applied for electronic commercial transaction or electronic banking, by implementing the OTP authentication using a voice call instead establishing the packet data session.

In addition, the present invention also provides a device, computer program product and method for discriminating whether or not a call is an OTP-authenticated call or whether or not its security has been acquired and informing the user accordingly. In this case, a CDMA signaling message is used and the user is informed through a sound or a visual icon.

In addition, in the present invention, signaling messages used in the existing IS-2000 system are extended and a particular connotation is given to some fields of a message for the OTP authentication in order to allow requesting and submitting of an OTP.

Figure 1:
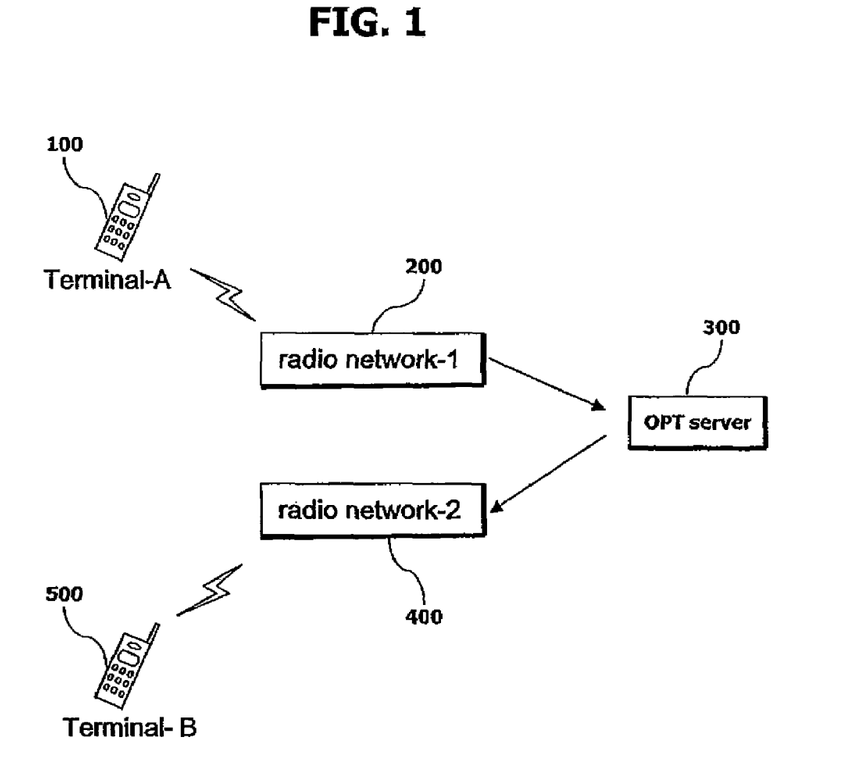
FIG. 1 is a schematic block diagram of a general OTP (One Time Pass) system.

FIG. 1 is a schematic block diagram of a general OTP (One Time Pass) system.

The method for operating the general OTP system will now be described with reference to FIG. 1.

An OTP server 300 generates the N number of OTP keys by hashing a seed for N number of times, and then transfers the N number of OTP keys to a terminal-A 100. Thereafter, the OTP server 300 erase the seed and stores the Nth key value. In generating the OTP keys or using a hashing function, a method of an RFC1760 or other methods may be used like the existing OTP system. The OPT server 300 may or may not reside within a base station or base station controller of either radio network-1 200 or radio network-2 400. Radio network-1 200 or radio network-2 400 may be networks operated by different carriers, or may be subnetworks operated by a common carrier.

In first step for OTP user authentication, the terminal-A 100 first provides the (N−1)th key to the OTP server 300. Then, the OTP server 300 applies the (N−1)th key received from the terminal-A 100 to the hashing function and generates the Nth key by applying the hashing function. OTP server 300 checks whether the generated Nth key is identical to the Nth key of its own, thus authenticating the user of the terminal-A 100. When a next authentication is performed, the terminal-A 100 transmits the (N−2)th key to the OTP server 300, and the OTP server 300 generates the (N−1)th key by applying the hashing function with the received key. And then, the OTP server 300 compares the (N−2)th key with the generated (N−1)th key of its own.

Figure 2:
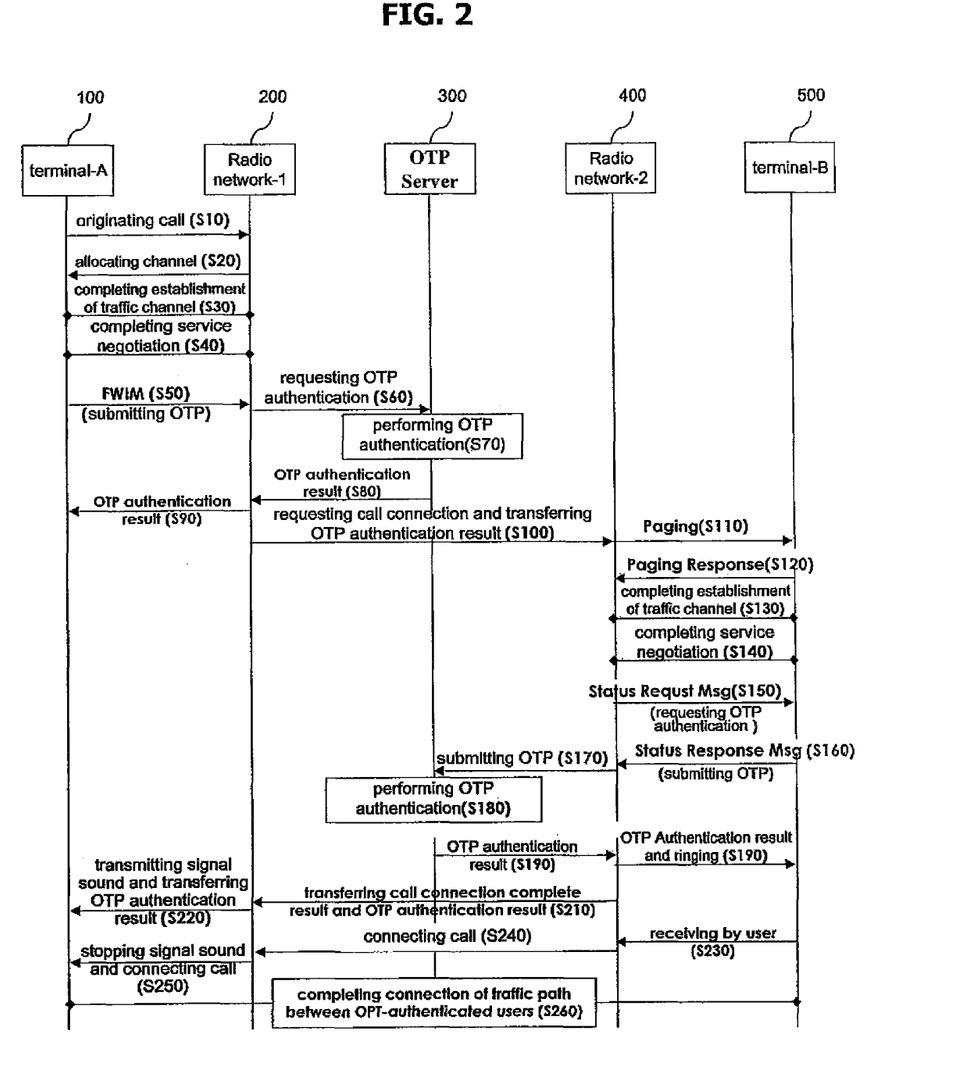
FIG. 2 is a view illustrating a signaling for establishing a voice call according to an exemplary embodiment of the present invention.

FIG. 2 is a view illustrating a signaling for establishing a voice call according to an exemplary embodiment of the present invention.

The signaling method for the OTP authentication according to the exemplary embodiment of the present invention will now be described with reference to FIGS. 1 and 2.

First, it is assumed that the terminal-A 100 and a terminal-B 500 have been allocated the N number of OTP keys from the OTP server 300. The procedure for performing authentication by exchanging the OTP keys between the OTP server 300 and the terminals 100 and 500 follows an operation method of the above-described OTP system.

In order to establish a call with security through the OTP authentication, the terminal-A 100 originates a call to a neighbor base station of a radio network-1 200 (S10) and is allocated a channel from the neighbor base station (S20). As the terminal-A 100 is allocated the channel from the neighbor base station, a traffic channel is established between the terminal-A 100 and the radio network-1 200 and a service negotiation is performed (S30 and S40). In this case, the steps S30 and S40 of establishing the traffic channel and performing service negotiation are performed in the same manner as those of a procedure of establishing a general voice call.

When a speech channel is opened through the steps S10 to S40, the user of the terminal-A 100 requests OTP authentication from the OTP server 300 by using an FWIM (Flash With Information Message) purporting that he would perform communication with security by using an OTP (S50). In this case, there are two methods for the terminal-A 100 to request the OTP authentication from the radio network-1 200.

A first method is that when the traffic channel is established, the OTP authentication is automatically requested. Namely, when the user sets a security call function of the terminal and originates a call, software of the terminal transmits a message (e.g., the FWIM, etc.) that automatically requests the OTP authentication, thus requesting the OTP authentication.

A second method is that the OTP authentication is requested according to the guidance of an ARS (Automatic Response System). That is, when a call origination is performed, the terminal-A 100 selects a user menu requesting the OTP authentication and is connected to the ARS that provides a security call through OTP authentication. Then, the user of the terminal requests the OTP authentication according to a usage guidance provided by the ARS.

The request for OTP authentication includes: giving a particular connotation to a certain field value of the FWIM and transmitting the same to the neighbor base station; and recognizing by the neighbor base station that the message of the terminal includes the request for OTP authentication, detecting an OTP key value included in the message, and requesting user authentication from the OTP server 300.

As explained with respect to the two steps, upon receiving the OTP key, the radio network-1 200 recognizes that the terminal-A100 has requested the OTP authentication and provides the OTP key value included in the message together with information allowing confirmation of the terminal such as the ESN or the MIN of the terminal to the OTP server 300 to request user authentication.

Including the key value for OTP authentication in the FWIM and transmitting the same is merely one exemplary embodiment of the present invention. That is, various other messages of a mobile communication system such as a data burst message or the like, as well as the FWIM, can be used for the purpose of OTP authentication.

Example of Requesting by the Terminal OTP Authentication from the Radio Network

The terminal-A 100 requests OTP authentication by applying a particular pattern to a keypad facility with an information record type of 00000011, among fields included in the FWIM. And the terminal-A 100 adds the (m−1)th OTP key value to be submitted this time next to the particular pattern.

For example, it is assumed that a value included in the keypad facility is ##OTP#12345678, wherein ##OTP# denotes that the terminal-A 100 requests OTP authentication and 12345678 denotes the OTP key value that is submitted this time. When there is such particular value as ##OTP# at a start portion of the keypad facility of the FWIM received from the terminal-A 100, the base station of the radio network-1 200 determines that the terminal has requested the OTP authentication and uses the 8-digit number values that follow ##OTP# for OTP authentication.

Upon receiving the request for OTP authentication of the terminal, the radio network-1 200 transfers the OTP key ((m−1)th one) which has been received together with the information (ESN or MIN, etc.) regarding the terminal-A 100 to the OTP server 300 in order to request OTP authentication (S60). The OTP server 300 hashes the received (m−1)th OTP key value to generate the mth result value, and compares it with the previous mth OTP key of its own, to thus authenticate the user of the terminal-A 100 (S70).

The authentication result is returned to the radio network-1 200 (S80), and the radio network-1 200 informs the terminal-A 100 about the returned result (i.e., whether the authentication has failed or has been successful) (S90).

If the authentication has failed, the radio network-1 200 transmits a call release command and a lock command (i.e., lock until power recycle order) or a maintenance command (i.e., maintenance required order) to the terminal-A 100. Or, the radio network-1 200 takes a proper measure or the like, such as transmitting an SMS message for requesting updating of the OTP key to the terminal-A 100. As the message for informing about the authentication failure, the radio network-1 200 may use a message such as the FWIM or an FNIM (Feature Notification Information Message), etc., or a data burst-message such as an SMS, etc.

If, however, the authentication is successful, the terminal-A 100 visually outputs a message informing about the success of the OTP authentication or outputs a corresponding sound to allow the user to easily recognize the authentication result. The radio network-1 200 maintains the traffic state with the terminal-A 100 and transmits a signal to the radio network-2 400 to which the other party (a recipient) for receiving the call belongs to request call connection (S100). In this case, the radio network-1 200 also transmits the OTP authentication result to allow the radio network-2 400 to recognize that the call has undergone the OTP authentication.

Upon receiving the request for call connection from the radio network-1 200, the radio network-2 400 pages the terminal-B 500, namely, the destination terminal (S110) and receives a paging response (S120). And then, the general call connection process (S110-S140) is performed: a traffic channel establishing process (S130) including traffic channel allocation is performed and a service negotiation (S140) is completed.

When the terminal-B 500 enters the traffic state, an OTP authentication is requested from the radio network-2 400 in order to verify the user of the terminal-B 500 and confirm this user to the radio network-1 200. Or, in order to allow a call to have security by using the OTP authentication, the radio network-2 400 may request OTP authentication from the terminal-B 500. Requesting or performing of the OTP authentication may be performed in the traffic state after the channel allocation is performed. The presence of the process of requesting the OTP authentication or providing the OTP key value in the traffic state is because the OTP authentication can be more stably performed in the traffic state compared with that using a paging channel or an access channel. That is, in the traffic state, a long code mask according to each terminal is used to perform demodulation, so the security can be increased compared with the case where the access channel or the paging channel is used.

The radio-network 2 400 requests the OTP authentication from the terminal by using a status request message which was agreed for the radio network and the terminal to exchange at the initial stage of the call set-up (S150). The radio network-2 400 uses a reserved status information record type of the status request message for the request of the OTP authentication. In response to the request for the TOP authentication of the radio network-2 400, the terminal-B 600 submits an OTP value by using a status response message, etc. (S160).

The base station 400 and the terminal 500 may use one of fields of a mobile communication signaling message (e.g., Start Query Manager (STRQM) command, etc.) which is not in use. Namely, a reserved one of a information record type of the message can be previously defined to be used for submission of an OTP and used.

The request for OTP authentication and the OTP key value according to the exemplary embodiment of the present invention may be transmitted through the FWIM, the status request message or the status response message, etc., provided in the IS-2000 through a traffic channel, and also can be transmitted by using a message that may include information of an information record. In this respect, determining which one of the reserved record type or field is to be used for OTP authentication can be applicable in various manners, so a detailed description therefore will not be mentioned in the present invention.

When the terminal-B 500 submits an OTP key value, the radio network-2 400 transmits the OTP key value which has been submitted for the OTP authentication to the OTP server 300 (S170). After the OTP authentication (S180) is performed, the OTP authentication result is received from the OTP server 300. If the result of the OTP authentication is a success, the radio network-2 400 allows the terminal-B 500 to make a bell sound. If, however, the result of the OTP authentication is a failure, the radio network-2 400 transfers a release order to the terminal-B 500 (S190-S200).

When the result of the OTP authentication is a success, it means that the destination terminal, namely, the terminal-B 500 has been also authenticated, so the radio network-2 400 informs the radio network-1 200 that a call connection is ready and the TOP authentication of the terminal-B 500 has been completed (S210). Then, the radio network-1 200 transmits a ring back tone (namely, a signal sound informing that the callee has picked up the receiver (or the callee has pressed a call key (e.g., a SEND key)) to the terminal-A 100 and, at the same time, transmits a message regarding the authentication result (success) of the terminal-B 500 (S220).

When the OTP authentication of the terminal-B 500 fails, the radio network-1 200 informs the terminal-A 100 about the authentication failure of the terminal-B 500 in various ways and releases the call.

There may be several methods for the radio network-1 200 to inform the terminal-A 100 about the authentication result (success or failure) of the terminal-B 500. For example, the radio network-1 200 may transfer the authentication result by using the messages such as the FWIM or the FNIM (Feature Notification Information Message), etc., or a data burst message such as an SMS, etc. Upon receiving the authentication result of the terminal-B 500, the terminal-A 100 displays the authentication result (whether it is successful or fails) as a sound message or as a visual message to the user.

Thereafter, when the user of the terminal-B 500 receives the call (S230), the radio network-2 400 connects a speech path with the radio network-1 200. Then, the radio network-1 200 stops transmission of the ring back tone to the terminal-A 100 and connects the speech path with the terminal-A 100 (S250).

When establishing of the speech path between the terminal-A 100 and the terminal-B 500 is completed, voice call communication between the both users starts (S260). At this time, an icon indicating the OTP-authenticated call is displayed on each screen of the terminals 100 and 500. Accordingly, the user can recognize whether the other party is the OTP-authenticated user or a general user according to whether or not the icon is displayed on the screen.

When the Mth OTP key is transmitted through the traffic channel and a corresponding response instruction (Ack order) of the radio network is received, and in this state, if a call is dropped due to fading, the terminal regards that the Mth OTP key has been used. Thus, it uses the (M-1)th OTP key in the next OTP authentication.

When a particular terminal fails for the OTP authentication, the OTP server 300 informs the corresponding terminal that it should receive the OTP key again, and informs the counter terminal about the failure of the OTP authentication of the particular terminal through the radio network.

Figure 3:
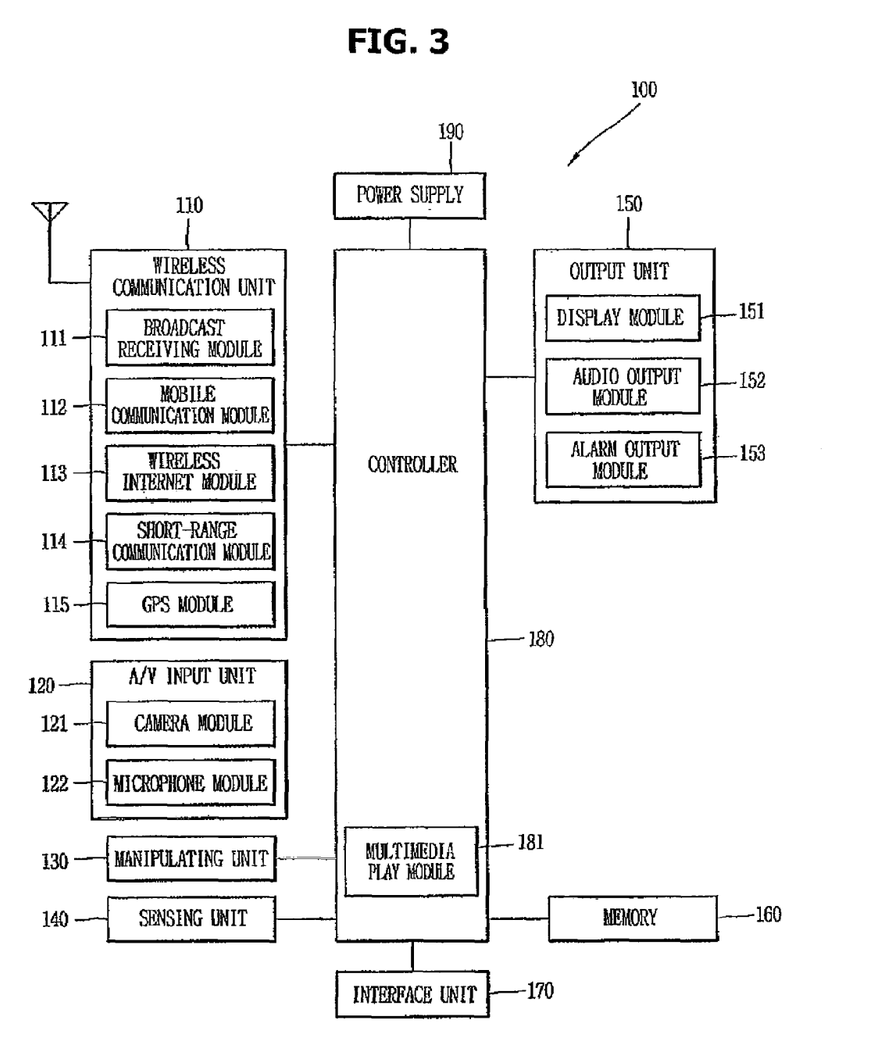
FIG. 3 is a block diagram of a mobile terminal according to an exemplary embodiment of the present invention.

FIG. 3 is a block diagram illustrating a mobile terminal according to an embodiment of the present invention. The mobile terminal of the present invention will be described with reference to FIG. 3 from the perspective of its functions.

The mobile terminal 100 may comprise elements, such as a wireless communication unit 110, an Audio/Video (A/V) input unit 120, a manipulating unit 130, a sensing unit 140, an output unit 150, a storage unit 160, an interface unit 170, a controller 180, and a power supply unit 190, and the like. When these elements are actually implemented in the mobile terminal, if required, two or more elements may be combined into one or one element may be divided into two or more elements.

Hereinafter, each element is described is sequence.

The wireless communication unit 110 may comprise at least one of a broadcast receiving module 111, a mobile communication module 112, a wireless internet module 113, a short-range communication module 114 and a Global Positioning System (GPS) module 115.

The broadcast receiving module 111 receives a broadcast signal and/or broadcast associated information from an external broadcast management server via a broadcast channel. The broadcast channel may include a satellite channel and a terrestrial channel. The broadcast management server may refer to a server that generates and transmits a broadcast signal and/or broadcast associated information or a server that receives a pre-generated broadcast signal and/or broadcast associated information and sends them to the mobile terminal. The broadcast associated information may include information associated with a broadcast channel, a broadcast program, or a broadcast service provider, etc. The broadcast signal may include not only a TV broadcast signal, a radio broadcast signal, and a data broadcast signal, but also a broadcast signal obtained by combining the data broadcast signal to the TV broadcast signal or the radio broadcast signal.

The broadcast associated information may be provided via a mobile communication network, and in this case, it may be received by the mobile communication module 112.

The broadcast associated information may exist in various formats. For instance, the broadcast associated information may exist in such formats as Electronic Program Guide (EPG) of Digital Multimedia Broadcasting (DMB), Electronic Service Guide (ESG) of Digital Video Broadcast-Handheld (DVB-H), and the like.

The broadcast receiving module 111 receives broadcast signals by using various types of broadcast systems. In particular, the broadcast receiving module 111 may receive digital broadcast signals by using digital broadcast systems such as Digital Multimedia Broadcasting-terrestrial (DMB-T), Digital Multimedia Broadcasting-satellite (DMB-S), Media Forward Link Only (MediaFLO), Digital Video Broadcast-handheld (DVB-K), Integrated Services Digital Broadcast-Terrestrial (ISDB-T), and the like. The broadcast receiving module 111 may be configured to be suitable for every broadcast system that provides broadcast signals as well as for the digital broadcasting systems. Broadcast signals and/or broadcast associated information received via the broadcast receiving module 111 may be stored in the storage unit 160.

The mobile communication module 112 transmits/receives radio signals to/from at least one of a base station, an external mobile terminal, and a server in a mobile communication network. Here, the radio signals may include a subscriber message (e.g., an SMS message, an FWIM, an FNIM status request message, a status response message, etc.), a voice call signal, a video call signal, or various formats of data according to transmission/reception of text/multimedia messages.

The wireless internet module 113 supports wireless Internet access. This module may be internally or externally coupled to the mobile terminal.

The short-range communication module 114 refers to a module for short range communications. As the short-range communication technology, Bluetooth, Radio Frequency IDentification (RFID), Infrared Data Association (IrDA). Ultra-WideBand (UWB), ZigBee, and the like, may be used.

The Global Positioning System (GPS) module 115 may receive location information from several artificial satellites.

The A/V input unit 120 is configured to input an audio or video signal. The A/V input unit 120 may include a camera module 121 and a microphone module 122. The camera module 121 processes image frames of still pictures or video obtained by an image sensor. In a video call mode or an image capturing mode. The processed image frames may be displayed on a display module 151.

The image frames processed by the camera module 121 may be stored in the storage unit 160 or transmitted to the exterior via the wireless communication unit 110. Two or more camera modules 121 may be provided according to the configuration of the mobile terminal.

The microphone module 122 may receive an external audio signal via a microphone in a phone call mode, a recording mode, a voice recognition mode, and the like, and process it into electrical voice data. The processed voice data may be converted for output into a format transmittable to a mobile communication base station via the mobile communication module 112 in case of the phone call mode. The microphone module 122 may include assorted noise canceling algorithms to cancel noise generated in the course of receiving the external audio signal.

The manipulating unit 130 may generate key input data inputted by a user to control the operation of the mobile terminal. The manipulating unit 130 may include a keypad, a dome switch, a touch pad (e.g., static pressure/capacitance), a jog wheel, a jog switch and the like. In particular, when the touch pad is overlaid on the display 151 in a layered manner, it may be called a touch screen.

The sensing unit 140 detects a current status of the mobile terminal 100 such as an open/close status of the mobile terminal 100, a location of the mobile terminal 100, presence or absence of user contact with the mobile terminal, etc., and generates a sense signal for controlling the operation of the mobile terminal 100. For example, when the mobile terminal 100 is a slide type mobile phone, the sensing unit 140 may sense whether the slide phone is open or closed. In addition, the sensing unit 140 performs a sensing function as to whether or not power supply unit 190 supplies power or whether or not the interface unit 170 is coupled with an external device.

The interface unit 170 serves, as an interface with every external device connected with the mobile terminal 100. For example, the external devices may include wired/wireless headsets, external chargers, wired/wireless data ports, card sockets (e.g., for coupling to a memory card, a Subscriber Identity Module/User Identity Module (SIM/UIM) card, etc.), audio Input/Output (I/O) ports, video I/O ports, earphones, microphones, and the like. The interface unit 170 may receive data from an external device or provided with power and transfer the received data or power to each element within the mobile terminal 100 or transfer data of the mobile terminal 100 to an external device.

The output unit 150 is configured to output an audio signal, a video signal or an alarm signal. The output unit 150 may include the display module 151, an audio output module 152, an alarm output module 153, and the like.

The display module 151 may output information processed in the mobile terminal 100. For example, when the mobile terminal is in the phone call mode, the display module 151 may display a User Interface (UI) or a Graphic User Interface (GUI) associated with a call. When the mobile terminal is in the video call mode or the image capturing mode, the display module 161 may display a captured and/or received image, or UI of GUI.

Meanwhile, when the display module 151 and the touch pad are overlaid in a layered manner to form a touch screen, the display module 151 may unction both as an input device and as an output device. The display module 151 may include at least one of a Liquid Crystal Display (LCD), a Thin Film Transistor-LCD (TFT-LCD), an Organic Light Emitting Diode (OLED), a flexible display, a three-dimensional (3D) display or the like. The mobile terminal 100 may include two or more display modules according to its embodiment. For example, the mobile terminal may include an external display module (not shown) and an internal display module (hot shown).

The audio output module 152 may receive audio data received from the wireless communication unit 110 or stored in the storage unit 160 in a call signal reception mode, a call mode, a record mode, a voice recognition mode, a broadcast reception mode, and the like. Also, the audio output module 152 may output an audio signal related to a function (e.g., a call signal reception sound, a message reception sound, etc.) performed in the mobile terminal 100. The audio output module 152 include a speaker, a buzzer, or the like.

The alarm output module 153 may output a signal to inform about an occurrence of an event of the mobile terminal 100. Typical events may include a call signal reception, a message reception, a key signal input, etc. The alarm output module 153 may output a signal to inform about an occurrence of an event in a different manner, besides an audio signal or a video signal. For example, the alarm output module 153 may output a signal in the form of vibration. When a call signal is received or when a message is received, the alarm output module 153 may output vibration to inform accordingly. Or, when a key signal is inputted, the alarm output module 153 may output vibration as a feedback to the inputted key signal. Through the output of vibration, the user can recognize the occurrence of the event. The signal informing about the occurrence of the event may be also outputted via the display module 151 or the audio output module 152.

The storage unit 160 may store a program for the processing and controlling performed by the controller 180, or may temporarily store inputted/outputted data (e.g., a phonebook, messages, still images, video, etc.). In the present invention, the storage unit 160 may store an OTP key allocated by the OTP server 300.

The storage unit 160 may include at least one type of storage medium including, a flash memory type, a hard disc type, a multimedia card micro type, a card-type memory (e.g., SD or DX memory, etc.), a Random Access Memory (RAM), a Read-Only Memory (ROM), and the like. Also, the mobile terminal 100 may operate a Web storage that performs the storage function of the storage unit 160 on the Internet.

The controller 180 typically controls general operations of the mobile terminal. For example, the controller 180 performs controlling and processing associated with voice calls, data communications, video calls, and the like. The controller 180 according to the present invention displays the instruction and operation data information or an authentication result received from the network 200 on the display module 151 for the user reference or convenience.

The controller 180 delivers the instruction information to the wireless communication unit 110 to generate a subscriber message (e.g., an SMS message, ah FWIM, an FNIM message status request message, a status response message, etc.) including the instruction information inputted by the user. And then, the controller 180 transmits the subscriber message to a destination via the wireless communication unit 110. Although not specifically mentioned in the embodiment of the present invention, the controller 180 is the core of the mobile terminals 100 and 500 that performs a signaling procedure, establishing a call with the radio networks 200 and 400 or transmitting and receiving various signals and messages when requesting an OTP authentication from the OTP server 300.

In addition, the controller 180 may include a multimedia reproducing module 181 for reproducing multimedia. The multimedia reproducing module 181 may be configured as a hardware component within the controller 180 or may be configured as a software component separated from the controller 180.

The power supply unit 190 receives external or internal power and supplies power required for the operations of the respective elements under the control of the controller 180.

So far, the internal elements of the mobile terminal related to the present invention have been described from the perspective of their functions. Hereinafter, external elements of the mobile terminal related to the present invention will be described from the perspective of their functions with reference to FIGS. 4 and 5. The mobile terminal may fee implemented in a variety of different configurations, including folder-type, a bar-type, a swing type, a slide-type, or the like. For the sake of brevity, the slide-type mobile terminal will be taken as an example in the following description. However, the present invention may not be limited to the slide-type mobile terminal, but can be applicable to any type of mobile terminals including the ones as mentioned above.

Figure 4:
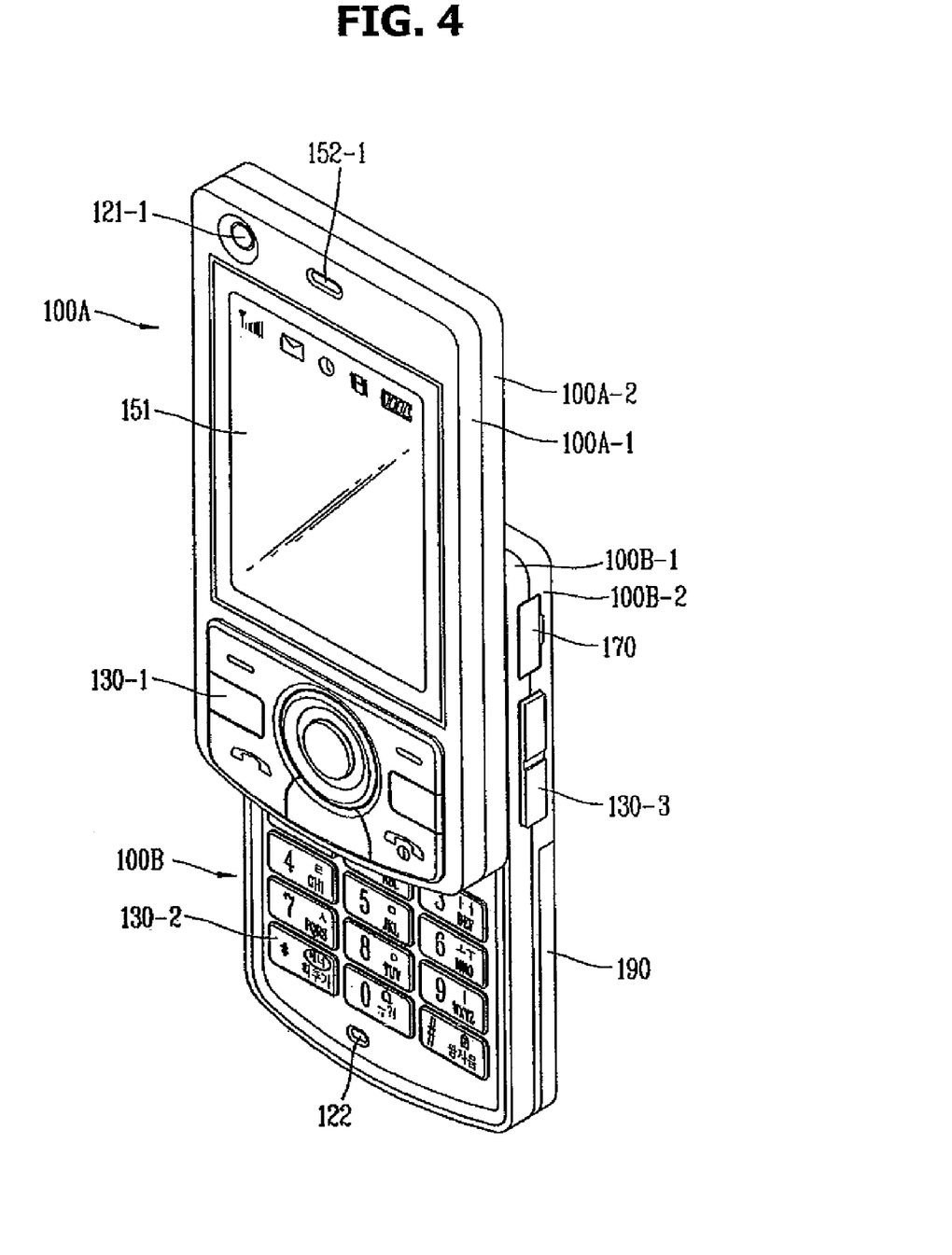
FIG. 4 is a front perspective view of the mobile terminal according to the exemplary embodiment of the present invention.

FIG. 4 is a front view of the mobile terminal according to the embodiment of the present invention.

The mobile terminal of the present invention may comprise a first body 100A, and a second body 100B configured to be slidably moved in at least one direction with respect to the first body 100A.

In a closed position, the first body 100A is positioned over the second body 100B in a manner that the second body 100B is obscured by the first body 100A. As illustrated in FIG. 11, in an open position, the first body 100A exposes at least part of the second body 100B.

A state in which the first body 100A is disposed to overlap with the second body 100B may be called a closed configuration, and as shown in FIG. 4, a state in which the first body 100A exposes at least a portion of the second body 100B may be called an open configuration.

The mobile terminal may usually operate in a standby mode in the closed configuration, but this mode can be released by a user manipulation. Also, the mobile terminal may mainly function in a call mode in the open configuration, but may be changed to the standby mode according to the user manipulation or after the lapse of a certain time.

A case (housing, casing, cover, etc.) constituting the external appearance of the first body 100A is formed by a first front case 100A-1 and a first rear case 100A-2. Various electronic embodiments may be installed in a space formed between the first front case 100A-1 and the first rear case 100A-2. One or more intermediate cases may be additionally disposed between the first front case 100A-1 and the first rear case 100A-2.

The cases can be formed by injection-molding a synthetic resin, or made of a metallic material such as stainless-steel (STS) or titanium (Ti).

The display module 151, a first audio output module 152-1, a first camera module 121-1 or a first manipulating unit 130-1 may be disposed on the first front case 100A-1 of the first body 100A.

The display module 151 may include LCD, OLED, and the like, that visually displays information.

A touch pad may be overlaid in a layered manner on the display module 151 to allow the display module 151 to function as a touch screen to input information.

The first audio output module 152-1 may be implemented as a receiver or a speaker.

The first camera module 121-1 may be implemented to be suitable for a user to capture still images or video of a user and so on.

Like the first body 100A, a case constituting the external appearance of the second body 100B may be formed by a second front case 100B-1 and a second rear case 100-2.

A second manipulating unit 130-2 may be disposed at the second body 100B, specifically, on a front face of the second front case 100B-1.

A third manipulating unit 130-3, a microphone module 122 and an interface unit 170 may be disposed at either the second front ease 100B-1 or the second rear case 100B-2.

The first to third manipulating units 130-1, 130-2 and 130-3 may be called a manipulating portion 130, and any method can be employed as the manipulation portion so long as it plan be operated in a tactile manner. The manipulating portion 130 can be implemented as a dome-switch or touch pad that can receive a command or information according to a push or touch manipulation of the user, or implemented in a manner of using a wheel, a jog or a joystick to rotate keys.

In terms of function, the first manipulating unit 130-1 is used for inputting commands such as start, end, scroll or the like, and the second manipulating unit 130-2 is used for inputting numbers, characters, symbols, or the like.

The third-manipulating unit 130-3 can be operated as a hot key for activating a special function within the mobile terminal.

The microphone module 122 may be implemented to be suitable for receiving user voice or various sounds.

The interface unit 170 may be used as a passage (path or link) through which the terminal can exchange data or the like with an external device. For example, the interface unit 170 may be implemented as one of a connection port for connecting an earphone to the mobile terminal through a fixed line or wirelessly, a port for short-range communications (e.g., an Infrared Data Association (IrDA) port, a Bluetooth port, a wireless LAN port, etc.), power supply ports for providing power to the external device, or the like.

The interface unit 170 may be a card socket for accommodating an external card, such as a Subscriber Identity Module (SIM), a User Identity Module (UIM), a memory card for storing information, or the like. The interface unit 170 has been described in detail. Thus, detailed description thereof will be omitted.

The power supply unit 190 for supplying power to the terminal is mounted at the side of the second rear case 100B-2.

The power supply unit 190 may be, for example, a rechargeable battery that can be detachably disposed for charging.

Figure 5:
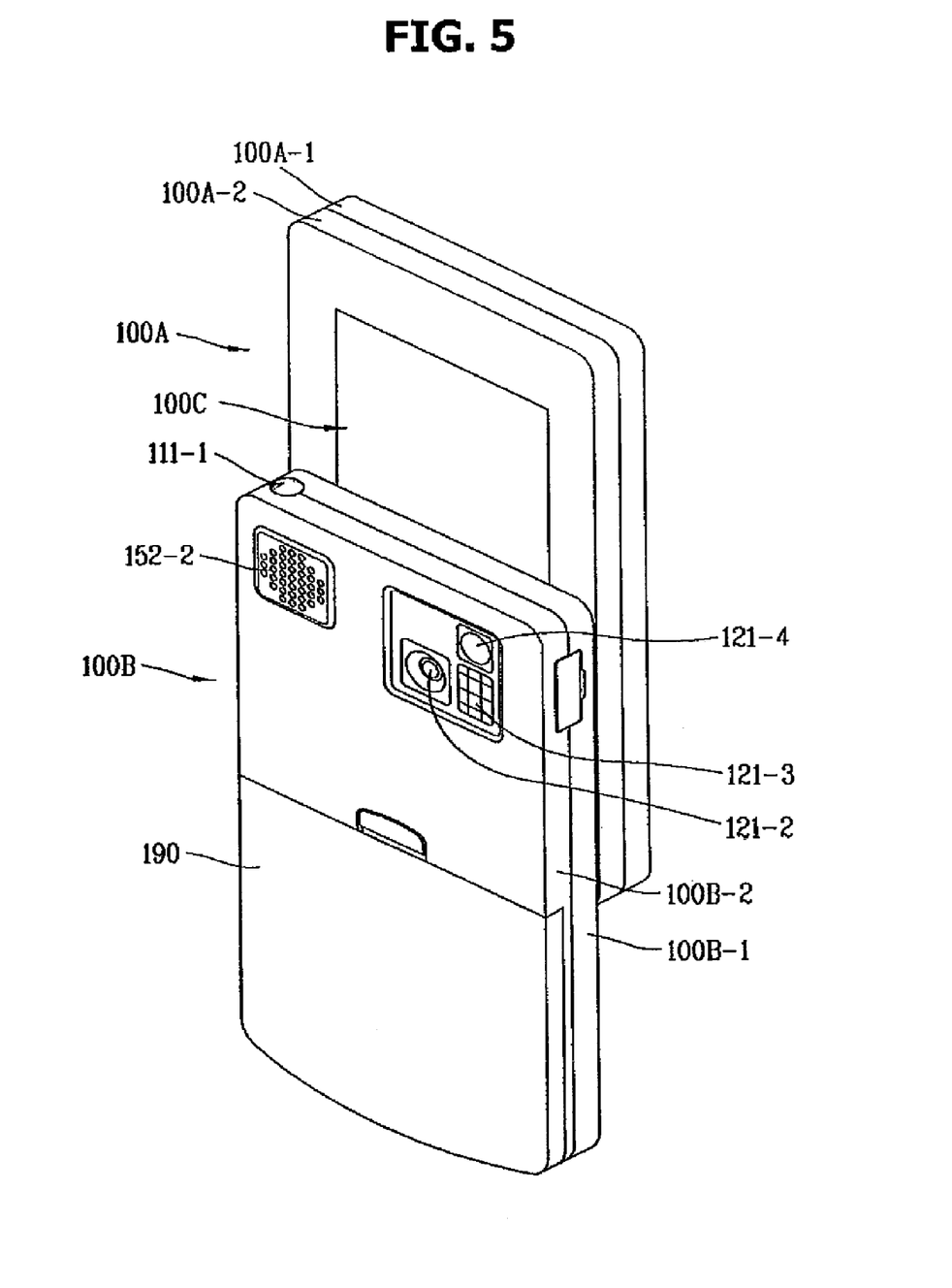
FIG. 5 is a rear perspective view of the mobile terminal according to the exemplary embodiment of the present invention.

FIG. 5 is a rear view of the mobile terminal according to the embodiment of the present invention.

As illustrated in FIG. 5, a second camera module 121-2 may additionally be disposed on a rear surface of the second rear case 100B-2 of the second body 100B. The second camera module 121-2 may have an image capture direction which is substantially the opposite to that of the first camera module 121-1 (See FIG. 1), and may have a different number of pixels as that of the first camera module 121-1.

For example, the first camera module 121-1 may be used for low resolution (i.e., supporting a relatively small number of pixels) to quickly capture an image (or video) of the user's face and immediately transmit the same to the other party during video conferencing or the like. Meanwhile, the second camera module 121-2 may be used for high resolution (i.e., supporting a relatively large number of pixels) in order to capture more detailed (higher quality) images (or video) which typically do not need to be transmitted immediately.

A flash 121-3 and a mirror 121-4 may be additionally disposed adjacent to the second camera module 121-2. When an image of the subject is captured with the second camera module 121-2, the flash 121-3 illuminates the subject. The mirror 121-4 allows the user to see himself when he wants to capture his own image (self-image capturing) by using the second camera module 121-2.

The second rear case 100B-2 may further include a second audio output module 152-2.

The second audio output module 152-2 may implement a stereophonic function in conjunction with the first audio output module 152-1 (See FIG. 2), and may be also used for a call in a speaker phone mode.

A broadcast signal receiving antenna 111-1 may be disposed at one side of the second rear case 100B-2, in addition to an antenna for call communications. The antenna 111-1 can be configured to be extended from the second body 100B-2.

One part of a slide module 100C that slidably combines the first body 100A and the second body 100B may be disposed on the first rear ease 100A-2 of the first body 100A.

The other part of the slide module 100C may be disposed oh the second front case 100B-1 of the second body 100B, which may not be exposed as shown in FIG. 4.

In the above description, the second camera module 121-2 and so on is disposed on the second body 100B, but the present invention may not be limited to the configuration.

For example, one or more of the elements (e.g., 111-1, 121-2, 121-3, 152-2, etc.), which are disposed on the second rear case 100B-2 in the above description, may be mounted on the first body 100A, mainly, on the first rear case 100A-2. In this case, those elements disposed in the first rear case 100A-2 can be protected by the second body 100B in the closed configuration. In addition, even if the second camera module 121-2 is not provided, the first camera module 121-1 may be configured to rotate (or otherwise be moved) to thus allow image capturing in various directions.

Various embodiment described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof.

For a software implementation, the embodiments described herein may be implemented with separate software modules, such as procedures and functions, each of which perform one or more of the functions and operations described herein. The software codes can be implemented with a software application written in any suitable programming language and may be stored in memory and executed by a controller or processor.

As far described, the method for signaling a voice call of a mobile terminal according to the present invention has the following advantages.

That is, the request and submission of an OTP for authenticating the user of the mobile terminal can be performed according to the voice call protocol. Namely, the signaling method proposed by the present invention allows the user authentication procedure using the OTP to be possibly performed in the process of establishing a general voice call, not through a data session of a packet data call, whereby the security of the mobile terminal can be strengthened and the strong demand of users with respect to protecting the privacy and information can be satisfied.

When the OTP user authentication is introduced to the mobile communication system, although the ESN or the authentication key (e.g., the A-key) of the mobile terminal is exposed due to the properties of the OTP scheme that performs authentication by using a different OTP each time, the security can be provided to protect a call against a replay attack of copied terminals.

The present invention has been explained with reference to the embodiments which are merely exemplary. It will be apparent to those skilled in the art that various modifications and equivalent other embodiments can be made in the present invention without departing from the spirit or scope of the invention. Thus, it is intended that the present invention cover modifications and variations of this invention provided they come within the scope of the appended claims and their equivalents.

What is claimed is:

1. A method for establishing a voice call between two networks of a mobile communication system via a server connected to the two networks, comprising:
    performing by the server an One Time Password (OTP) authentication of an origination terminal by performing a call connection between the origination terminal and an origination side network, the origination terminal transmitting a corresponding message including a first OTP key value to the origination side network;
    requesting by the server a call connection to a termination side network by transmitting an OTP authentication result of the origination terminal;
    performing by the server an OTP authentication of a destination terminal by performing a call connection between the termination side network and the destination terminal when the origination terminal is successfully authenticated, a destination terminal transmitting a corresponding message including a second OTP key value to a destination side network;
    establishing by the server a call connection link between the origination terminal and the destination terminal when the destination terminal is successfully authenticated; and
    displaying an icon indicating the OTP-authenticated call on a screen of both the origination terminal display and the destination terminal display when the call connection link is established,
    wherein the first OTP key value is different from the second OTP key value.

2. The method of claim 1, wherein the step of performing the OTP authentication of the origination terminal comprises:
    originating a call, by the origination terminal, to the origination side network, and receiving an allocation of a traffic channel between the origination terminal and the origination side network;
    opening the traffic channel between the origination terminal and the origination side network; and
    requesting the OTP authentication from the origination side network by transmitting the message including the first OTP key value.

3. The method of claim 1,
    wherein the message includes an FWIM (Flash With Information Message), and wherein the destination side network detects the first OTP key value from the message and requests the server to authenticate the origination terminal.

4. The method of claim 1, wherein the OTP authentication of the origination terminal is performed according to a guidance of an ARM (Automatic Response System).

5. The method of claim 1, wherein when the OTP authentication of the origination terminal fails, the origination side network transfers a call release order to the origination terminal.

6. The method of claim 5, wherein the origination side network uses a data burst message as a message for informing about the origination terminal OTP authentication failure.

7. The method of claim 5, wherein the origination side network uses at least one of an FWIM (Flash With Information Message), an FNIM (Feature Notification Information Message), an SMS (Short Message Service) message as a message for informing about the authentication failure.

8. The method of claim 1, wherein the step of performing the OTP authentication of the destination terminal comprises:
    performing, by the termination side network, paging and channel allocation;
    opening a traffic channel between the termination side network and the destination terminal;
    receiving the message including the second OTP key value from the destination terminal; and
    requesting the server to authenticate the destination terminal through the traffic channel between the termination side network and the destination terminal.

9. The method of claim 1, wherein the step of establishing a call connection link between the origination terminal and the destination terminal comprises:
    transferring a result of the call connection between the termination side network and the destination terminal and an OTP authentication result of the destination terminal to the origination side network, when the destination terminal is successfully authenticated; and
    establishing the call connection link and performing a voice call service between the origination terminal and the destination terminal, when the call connection result between the termination side network and the destination terminal and the OTP authentication result of the destination terminal to the origination side network denote a success.

10. A method for establishing a voice call of an origination terminal, comprising:
   establishing a traffic channel with a network;
   requesting an One Time Password (OTP) authentication from an authentication server by transmitting a message including an OTP key value;
   receiving a call connection result, an OTP authentication result of an originating side and an OTP authentication result of a destination terminal when the call is successfully authenticated;
   establishing a call connection link with the destination terminal when the call connection result and the destination terminal OTP authentication result denote success; and
   displaying an icon indicating the OTP-authenticated call on a screen when the call connection link is established.

11. The method of claim 10, further comprising:
   receiving a failure message for informing about an OTP authentication failure when the OTP authentication fails, the failure message including at least one of an FWIM (Flash With Information Message), an FNIM (Feature Notification Information Message), an SMS (Short Message Service) message.

12. A mobile communications terminal, comprising:
   a communications module; and
   a controller operatively connected to the communications module and containing software configured to cause the mobile communications terminal to:
   establish a traffic channel with a network;
   request an One Time Password (OTP) authentication to a server by transmitting a message including an OTP key value;
   receive a call connection result, an OTP authentication result of an originating side and an OTP authentication result of a destination terminal when the call is successfully authenticated;
   establish a voice call connection link with the destination terminal when the call connection result and the destination terminal OTP authentication result denote success; and
   display an icon indicating the OTP-authenticated call on a screen when the call connection link is established.

13. The mobile communication terminal of claim 12, the controller further configured to:
   receive the result of the call connection between the termination side network and the destination terminal and the authentication result of the destination terminal from the origination side network, when a caller is successfully authenticated.

14. The mobile communications terminal of claim 12, wherein the software is further configured to cause the mobile communications terminal to receive a call release order when a caller is not successfully authenticated.

15. The mobile communications terminal of claim 14, wherein call release order comprises a data burst message.

16. The mobile communications terminal of claim 14, wherein the call release order comprises:
   at least one of an FWIM (Flash With Information Message), an FNIM (Feature Notification Information Message), an SMS (Short Message Service) message.

* * * * *